United States Patent
Lo et al.

[19]

[11] Patent Number: 6,122,483
[45] Date of Patent: Sep. 19, 2000

[54] METHOD AND APPARATUS FOR MULTICAST MESSAGING IN A PUBLIC SATELLITE NETWORK

[75] Inventors: Wing F. Lo, Plano; Stewart O'Dell, Richardson; Payam Maveddat, Plano, all of Tex.

[73] Assignee: Nortel Networks Limited, Montreal, Canada

[21] Appl. No.: 09/342,168

[22] Filed: Jun. 28, 1999

[51] Int. Cl.⁷ .................................................. H04B 7/185
[52] U.S. Cl. .......................... 455/12.1; 455/427; 455/458
[58] Field of Search .................................. 455/427, 430, 455/12.1, 458, 510, 517

[56] References Cited

U.S. PATENT DOCUMENTS

| | | | |
|---|---|---|---|
| 4,723,264 | 2/1988 | Sasuta et al. | 379/58 |
| 5,274,837 | 12/1993 | Childress et al. | 455/7 |
| 5,481,258 | 1/1996 | Fawcett et al. | 340/825.47 |
| 5,625,624 | 4/1997 | Rosen et al. | 370/307 |
| 5,742,639 | 4/1998 | Fasulo, II et al. | 375/219 |
| 5,930,723 | 7/1999 | Heiskari et al. | 455/518 |
| 5,956,390 | 9/1999 | Mckibben et al. | 379/93.07 |
| 5,956,648 | 9/1999 | Brennan et al. | 455/518 |
| 5,991,599 | 11/1999 | Uchikawa | 455/20 |

*Primary Examiner*—Edward F. Urban
*Assistant Examiner*—Marceau Milord
*Attorney, Agent, or Firm*—James Harrison; Bruce Garlick

[57] ABSTRACT

A satellite communication system provides multicast messaging services to subscriber units. Upon receipt of a multicast communication page from a satellite communication system network, a subscriber unit waits for a random delay period and then responds with an acknowledge signal. Based upon the time of receipt of the acknowledge signal, e.g., within one of a plurality of time periods, the satellite communication system network assigns the subscriber unit to one of a plurality of traffic channels. The satellite communication system infrastructure then sends a multicast communication message to the subscriber unit on the assigned traffic channel. The subscriber unit then waits for a random delay period and then responds with an acknowledge signal. The satellite communication system network then receives the acknowledge signal. Each of a plurality of subscriber units introduces a random delay before transmitting an acknowledge signal so that the satellite communication system network may determine which of the subscriber units received the multicast communication system message.

24 Claims, 8 Drawing Sheets

METHOD AND APPARATUS FOR MULTICAST MESSAGING IN A PUBLIC SATELLITE NETWORK

BACKGROUND

1. Technical Field

The present invention relates generally to satellite communication systems and more particularly to a satellite system and method of operation for delivering multicast messages to a plurality of subscriber units.

2. Related Art

Satellite communication systems are generally known to facilitate wireless communication with mobile terminals across most areas of the Earth. The satellite communication systems typically provide wireless coverage in areas served neither by the public switched telephone network (PSTN) nor by cellular communication systems and thus provide extremely valuable functions. Satellite communication systems are also valuable for international travelers because location updates and call routing are simplified. For example, a local communication network does not have to be compatible with the network of the international traveler's location to route a call.

In a satellite communication system, at least one satellite operates from an orbit above the earth. International telecommunication satellites typically operate from a geostationary orbit (GEO) that is approximately 36,000 kilometers above earth. Alternatively, telecommunication satellites have also been deployed in orbits closer to Earth such as low Earth orbits (LEOs) at an altitude from 780 kilometers to 1,390 kilometers or medium Earth orbits (MEOs) at approximately 10,000 kilometers. A network control center serves as a terrestrial connection point for communications in the satellite communication system. The network control center transmits communications to and from the subscriber units via one or more satellites. Typically, a single network control center services a large geographic area. In some cases, this geographic area extends across one or more countries.

As contrasted to satellite communication systems, cellular wireless communication networks typically include a plurality of base stations, each of which communicates with a plurality of mobile stations operating within the cell it supports. Because of the cellular network architecture, a given communication channel (at a particular frequency) may be reused or reassigned for by multiple base stations in geographically distant cells. The concept of common channel allocation (channel reuse) is applicable to AMPS networks where given frequency assignments are made, to TDMA networks where given time slices at specified frequencies are made and CDMA networks where code assignments are made to allow a mobile station to decode a communication.

In satellite systems, however, channels cannot be reused since no geographic separation exists between the subscriber units relative to the satellite/network control center. Accordingly, only one mobile station may be assigned a given channel at any time. Accordingly, certain desirable communication modes that are common in terrestrial cellular networks are problematic in satellite based networks.

By way of example, multicast messaging is currently provided by many communication systems. In providing the multicast messaging service, confirmation of receipt of the multicast messages by subscribing mobile stations is desirable. In cellular based wireless communication systems, confirmation of receipt is easily performed since each base station services only a limited number of subscriber units. However, in a satellite communication system, acknowledgment would result in too many subscriber units attempting to respond on a control channel to a network control center. These responses would be unintelligible to the network control center. Acknowledged multicast messaging in a satellite communication system would have to be performed on a traffic channel and would consume significant available resources. Delivery of multicast messages within a satellite system therefore either (1) consumes significant channel resources; or (2) must be performed without acknowledgment. Neither of these solutions is satisfactory in supporting multicast messaging.

Thus, there exists a need in the art for a satellite based communication system in which multicast messages requiring acknowledgment may be made in a way that confirms delivery of the messages but that also minimizes the consumption of valuable channel resources.

SUMMARY OF THE INVENTION

Thus, to overcome the shortcomings of the prior systems and their operations, a satellite-based communication network services subscriber units that wait a random amount of time before generating an acknowledge signal either to a paging signal for a multicast message or to the actual multicast message itself. If the subscriber unit receives a page or a message intended for it alone, then it transmits an acknowledge signal immediately after receiving the message or according to other defined standard. By delaying the transmission of the acknowledge signal for a random amount of time for multicast messages requiring acknowledgment, control and traffic channel congestion is reduced. This reduced congestion, in turn, makes it possible to service multicast messaging wherein subscriber units acknowledge the multicast messages without consuming significant traffic channel resources.

According to the present invention, a subscriber unit includes a processing unit, a memory for storing a terminal ID and at least one group ID, a random number generator and a clock. The processing unit of the subscriber unit examines an incoming message and determines if the message is intended for it specifically or for a select group to which it belongs. If the message is intended for it, it responds immediately. If the message is intended for a select group to which it belongs, the processing unit of the subscriber unit receives a random number from a random number generator. It uses the random number to calculate a random time value. The processing unit then periodically determines elapsed time from clock signals to determine when the random time value has expired. Once the random time value has expired, the processing unit generates an acknowledge signal that is to be transmitted by a subscriber unit transceiver.

An inventive method in a network control center includes grouping received acknowledge signals according to when the acknowledge signals were received. The subscriber units in each group are then assigned to a traffic channel.

By assigning the different groups of responding subscriber units to different traffic channels (wherein the multicast message is transmitted on the different traffic channels), and by further having subscriber units that acknowledge receipt of the multicast message at random times, a system is created in which subscriber units in a satellite-based telecommunication network may acknowledge receiving a multicast message notwithstanding ordinary system constraints.

Moreover, other aspects of the present invention will become apparent with further reference to the drawings and specification that follow.

BRIEF DESCRIPTION OF THE DRAWINGS

A better understanding of the present invention can be obtained when the following detailed description of the preferred embodiment is considered with the following drawings, in which.

DETAILED DESCRIPTION OF THE DRAWINGS

Figure 1:
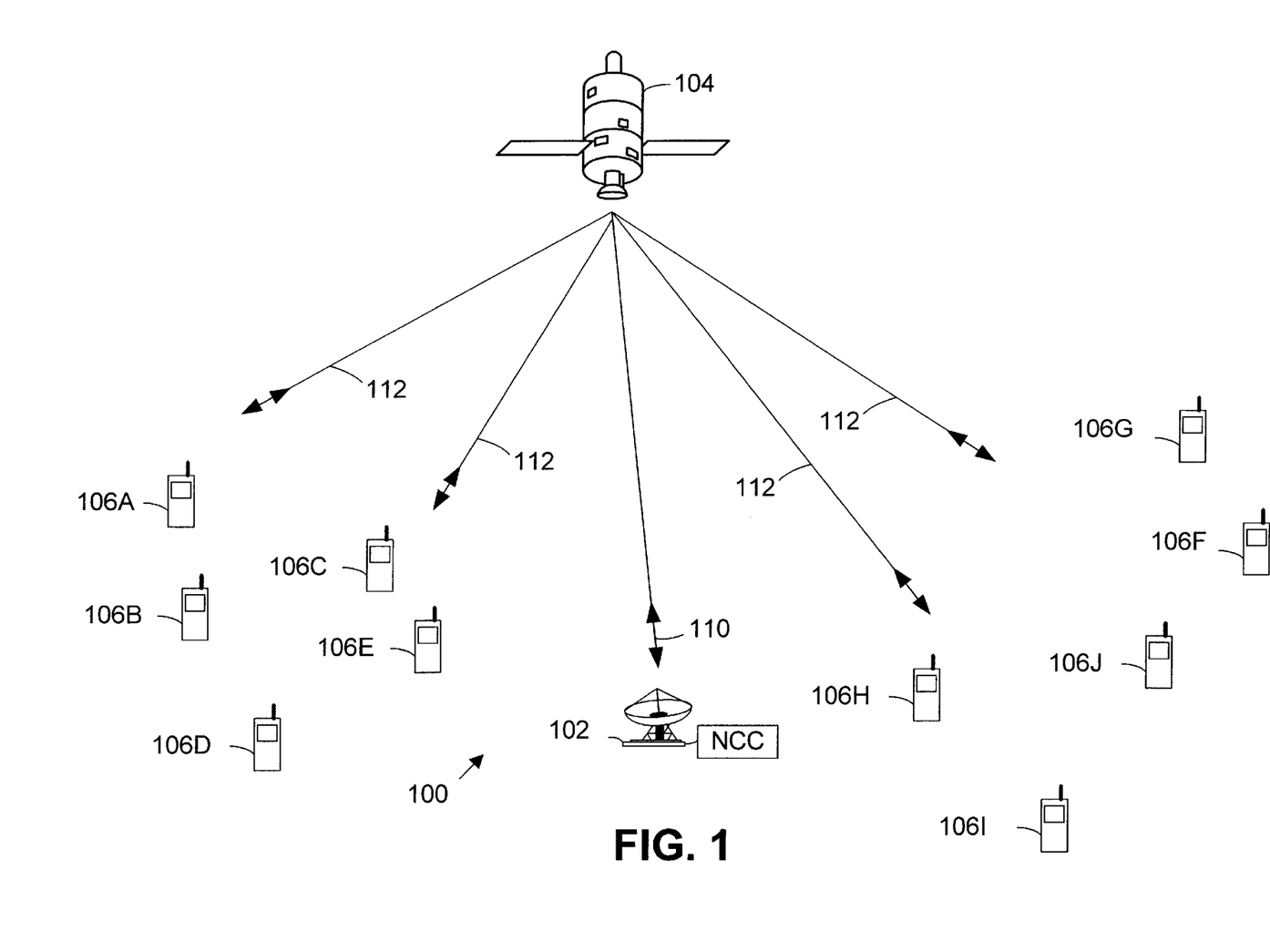
FIG. 1 is a diagram illustrating a satellite communication system that services a plurality of subscriber units, the satellite communication system including a network control center and a satellite constructed according to the preferred embodiment of the invention.

FIG. 1 is a diagram illustrating a satellite communication system that services a plurality of subscriber units, the satellite communication system including a network control center and a satellite constructed according to the preferred embodiment of the invention. A network control center (NCC) 102 includes circuitry for controlling and transceiving communication signals with a plurality of subscriber units 106A–106J via a satellite 104. For illustrative purposes a communication link between the NCC 102 and the satellite 104 is illustrated at numeral 110 while communication links between satellite 104 and subscriber units 106A–106J are illustrated at numeral 112. As is generally known, the satellite in a satellite based communication serves simply to relay signals between the NCC 102 and the subscriber units 106A–106J and modifies signals only as may be required to relay them.

The NCC 102 sends page requests to the subscriber units 106A–106J via the satellite 104. A page request is a signal transmitted over a control channel to prompt either a specific subscriber unit or a group of subscriber units to respond. Typically, paging signals are transmitted during the setup of a call. A page request may be addressed to a specific subscriber unit, by way of example, subscriber unit 106A. In a satellite based wireless communication network, the NCC 102 sends a paging signal via the satellite 104 over a control channel that, theoretically, is received by all subscriber units. The paging signal, includes, however, a unique address for the specific subscriber unit(s) to which the communication is being directed. Accordingly, only the specified subscriber unit having the unique address specified in the paging signal respond(s). The response to the page request typically also is made over a defined control channel. The responding subscriber unit(s) respond by sending an acknowledge message to the NCC 102 via the satellite 104. Because cellular devices of terrestrial cellular networks respond to a page with an acknowledge immediately after being received, it generally is considered that satellite-based systems cannot incorporate common multicast messaging that requires acknowledgment because the defined control channels cannot carry all of the acknowledge signals generated by the subscriber units.

According to the present invention, however, a NCC 102 can transmit multicast messages to a select group of subscriber units and to receive an acknowledge signal responses from the select group of subscriber units. As will be described in more detail in the discussion of the figures that follow, NCC 102 is operable to transmit a multicast message to a select group of subscriber units. A specified group ID for the select group is transmitted within the multicast message. The subscriber units within the select group having the specified group ID are operable to respond randomly. By responding randomly, the NCC 102 is able to process the responses from the subscriber units to produce meaningful results.

In a group paging operation for purposes of multicast messaging, NCC 102 transmits a multicast paging signal to satellite 104 over communication link 110 and the satellite 104 relays the multicast paging signal via communication links 112. The multicast paging signal includes a group ID that identifies the subscriber units to which a subsequent multicast message is directed. In the described example of FIG. 1, all of the subscriber units receive the paging signal from satellite 104. Only subscriber units 106A, 106C, 106F and 106H include the group ID specified in the multicast paging signal. For convenience, the group of subscriber units having the specified group ID are referenced as the select group. In an alternate embodiment, the subscriber units utilize a hash algorithm to determine if the message is intended for a select group to which the subscriber unit belongs. In general, a hash algorithm receives a plurality of input digits and produces an output to determine if an incoming message is intended for it. If the input hashes to a particular output, one or more of the subscriber units will determine that the page is intended for it.

Once the subscriber units of the select group determine that they are being paged, they each respond by initially suppressing the transmission of an acknowledge signal over a control channel until a specified time has elapsed. The specified amount of time is a random value generated within each subscriber unit by a random number generator. Accordingly, the responses from the select group of subscriber units are randomly distributed to allow increased control channel throughput. It is understood, of course, that FIG. 1 shows only four subscriber units as being in the select group, but, in reality, the select group can include hundreds or even thousands of subscriber units.

NCC 102, upon receiving the randomly transmitted acknowledge signals via satellite 104, assigns multicast message channels accordingly. The multicast message channels may simply be traffic channels that are used for multicast messaging during the current time frame. Thereafter, NCC 102 transmits the multicast messages on the assigned multicast message traffic channels and then listens, again, for randomly distributed acknowledge signals. In one embodiment, the randomly distributed acknowledge signals are transmitted via a control channel. In another embodiment, the randomly distributed acknowledge signals are transmitted via the assigned message channel.

Figure 2:
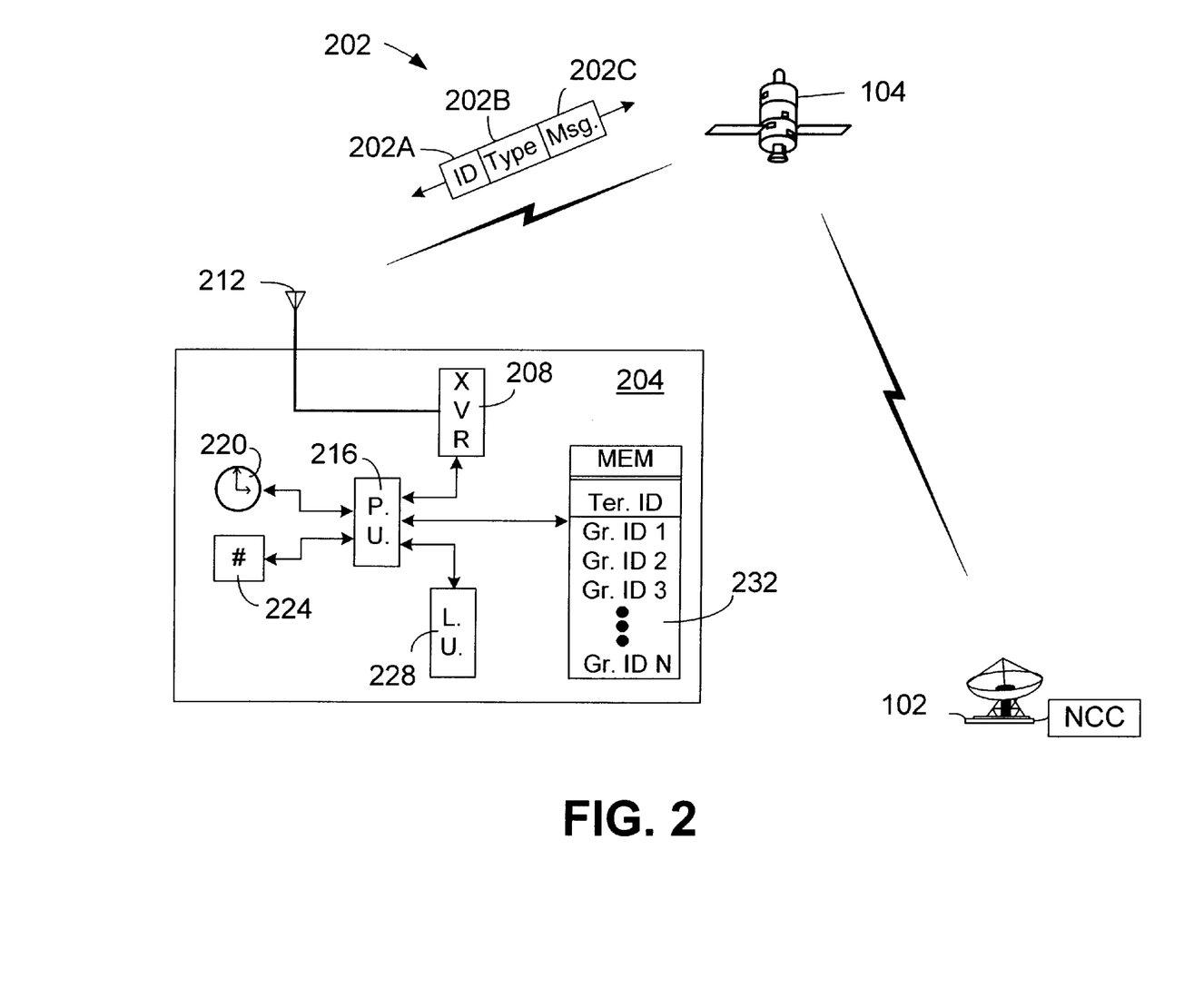
FIG. 2 is a functional block diagram illustrating a subscriber unit in communication with a network control center according to a preferred embodiment of the invention.

FIG. 2 is a functional block diagram illustrating a preferred embodiment of a subscriber unit in communication with a network control center via a satellite according to a preferred embodiment of the invention. NCC 102 is operable to transmit communication signals to satellite 104. Satellite 104 receives the communication signals and transmits the same communication signals to the subscriber units that are operable to receive the transmissions from the satellite 104.

FIG. 2 shows that satellite 104 transmitted communication signal 202 to subscriber unit 204. It is understood, however, that communication signal 202 is transmitted to be received by all of the subscriber units operating in the satellite communication network. As will be described in greater detail below, the subscriber units process the received communication signal 202 enough to determine whether the corresponding message is for it. Communication signals 202 typically include a subscriber unit ID (terminal ID) to identify the intended terminal for the subsequent message.

As may be seen therefore, communication signal 202 includes a first portion 202A that includes an ID that identifies the intended recipients) of the message. By way of example, the ID may be a subscriber unit ID if the communication signal is for a specific subscriber unit. Alternatively, according to the present invention, the ID may be a group ID that identifies a select group of subscriber unit s t hat are to receive the corresponding message.

In one embodiment of the invention, communication signal 202 also includes a second portion 202B that identifies whether the message is one that is for one subscriber unit or whether it is a multicast message for a group of subscriber units. Finally, the message 202 also includes a third portion 202C that includes the message itself. By way of example, the message 202 may be a control channel message wherein third portion 202C is a paging signal requiring subscriber units to acknowledge the page. In the case of the message being directed to only one subscriber unit, only one subscriber unit will be expected to respond with an acknowledge. In the case of a multicast message, however, many subscriber units similar to subscriber unit 204 of FIG. 2 will be expected to respond.

Continuing to refer to FIG. 2, subscriber unit 204 includes circuitry that is operable to respond to a multicast communication signal. For example, if communication signal 202 includes a group ID in first portion 202A and an indication in second portion 202B that the message is a multicast message (for example, a multicast page), the circuitry of subscriber unit 204 is operable to allow system wide multicast messages to be made.

More specifically, subscriber unit 204 includes a transceiver 208 for receiving and transmitting communication signals via antenna 212. Transceiver 208 is coupled to transmit received communication signals 202 to processing unit 216 and to receive communication signals therefrom that are to be transmitted to satellite 104. Processing unit 216, in turn, is connected to receive timing signals from a clock 220 to allow processing unit 216 to measure elapsed time. Processing unit 216 also is connected to receive random numbers from a random number generator 224 and to logic unit 228 to receive program instructions to operate in a manner described herein according to the present invention. Finally, processing unit 216 is connected to memory 232 for receiving a stored terminal ID and at least one group ID.

The NCC 102 includes the same, or similar components as those that are shown to be included in the subscriber unit 204. Thus, the NCC 102 includes a radio frequency transceiver and an antenna (dish antenna) for transmitting communications to, and receiving communications from the satellite 104. The NCC 102 also includes a processing unit that couples to the radio frequency transceiver, a clock, at least one logic unit and a memory. The structure of the NCC 102 will be described in more detail with reference to FIG. 8. Its operation, however, is discussed with reference to FIGS. 1 through 7 herein.

In operation, subscriber unit 204 receives the communication signal 202 and, responsive thereto, transmits an acknowledge signal only after a random period has expired if communication signal 202 is a multicast message. More specifically, if, by way of example, message 202 is a page intended solely for subscriber unit 204, subscriber unit 204 transmits an acknowledge signal substantially immediately after signal 202 was received or according to other timing established for the particular operating protocol. If, however, message 202 is a multicast page, subscriber unit allows a random period to expire before transmitting the acknowledge signal.

When subscriber unit 204 receives signal 202, it examines the ID in the first portion 202A and compares it to the terminal ID stored in memory 232 to determine if the page is intended only for it. If so, the subscriber unit responds to the page substantially immediately and performs subsequent operations based thereupon. If, on the other hand, the second portion 202B indicates that the message is a multicast page intended for a select group of subscriber units, processing unit 216 compares the ID in first portion 202A to the at least one group ID stored in memory 232. If memory 232 includes more than one group ID, processing unit 216 compares the ID in first portion 202A to each of the stored group IDs to determine if subscriber unit 204 is within the select group for which the message is intended.

If the message is a multicast page and if processing unit 216 determines that subscriber unit 204 is within the select group for whom the message is intended, processing unit 216 takes steps to delay the transmission of an acknowledge signal. Specifically, it communicates with the random number generator 224 to receive a random number generated by it. Processor 216 then calculates an amount of time that should expire before subscriber unit transmitting an acknowledge signal. The calculated amount of time is a function of the random number received according to logic specified within the subscriber unit. For example, if the random number generator is operable to produce random numbers in the range from 0 to 1, processor 216 converts the random number to a time delay value that ranges from 0 to the maximum amount of delay that is desired prior to the transmission of the acknowledge signal. In the described embodiment, the range of delay is from zero time to at least the product of the maximum number of subscriber units in the select group and the duration of the acknowledge signal. For example, if a maximum of 100 subscriber units can be members of a select group and the duration of the acknowledge signal is 10 milliseconds, the range of delay is from zero to at least 1000 milliseconds. The actual maximum delay would be sufficient to give an acceptably low probability of subscriber units transmitting acknowledge signals simultaneously.

Processing unit 216 also is coupled to receive clock signals from clock 220 to measure elapsed time so that it may determine when an amount of time corresponding to the random amount of time has expired. Once the random amount of time has expired, subscriber unit generates and transmits an acknowledge signal responsive to communication signal 202. The acknowledge signal is transmitted to satellite 104 that, in turn, relays the acknowledge signal to NCC 102.

Figure 3:
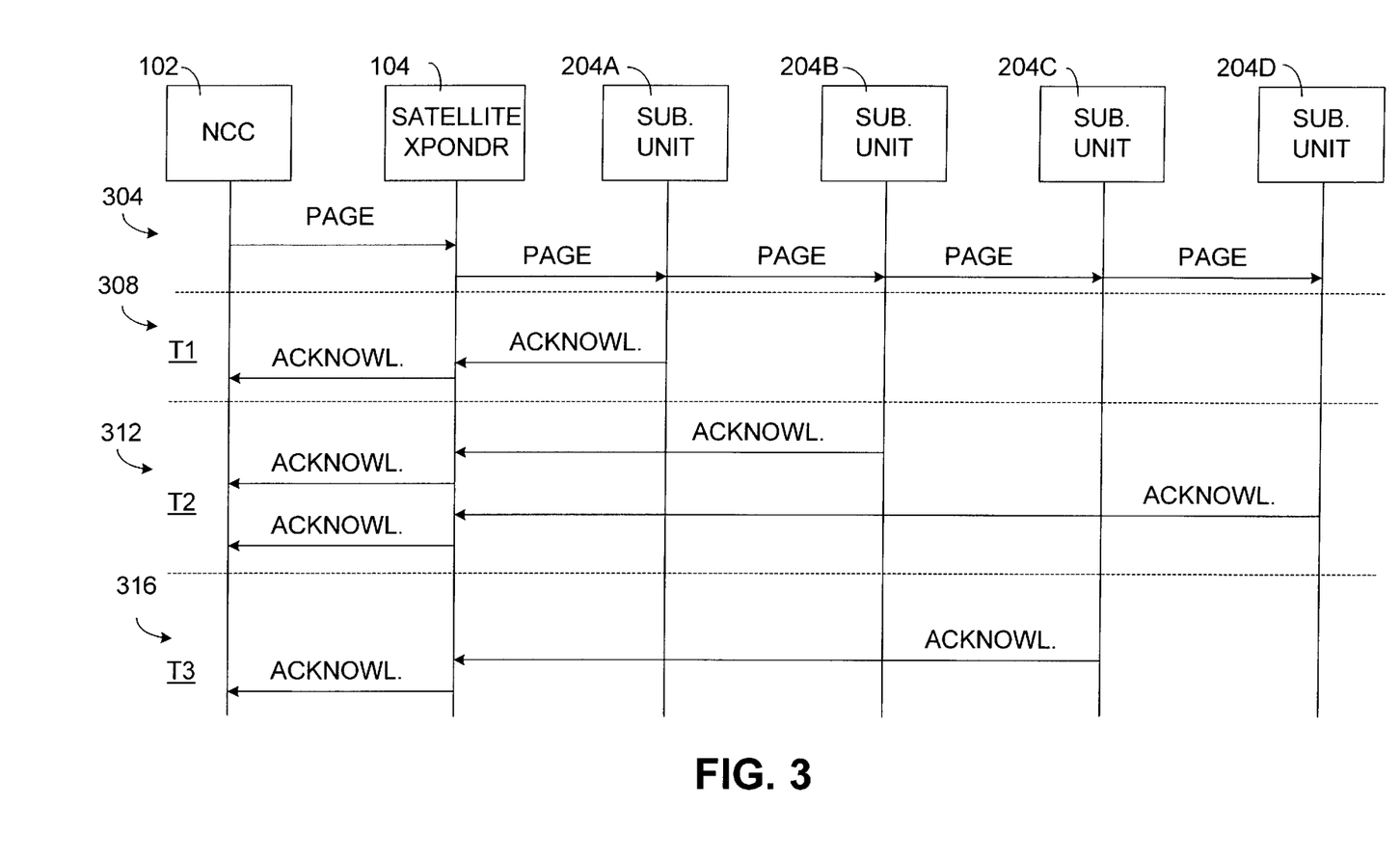
FIGS. 3 and 4 are timing diagrams that illustrate a random distribution of the transmission of response signals by a plurality of subscriber units responsive to a multicast message page from a network control center and how subsequent channel allocations are made responsive to the random distribution of responses according to a preferred embodiment of the invention.
Figure 4:
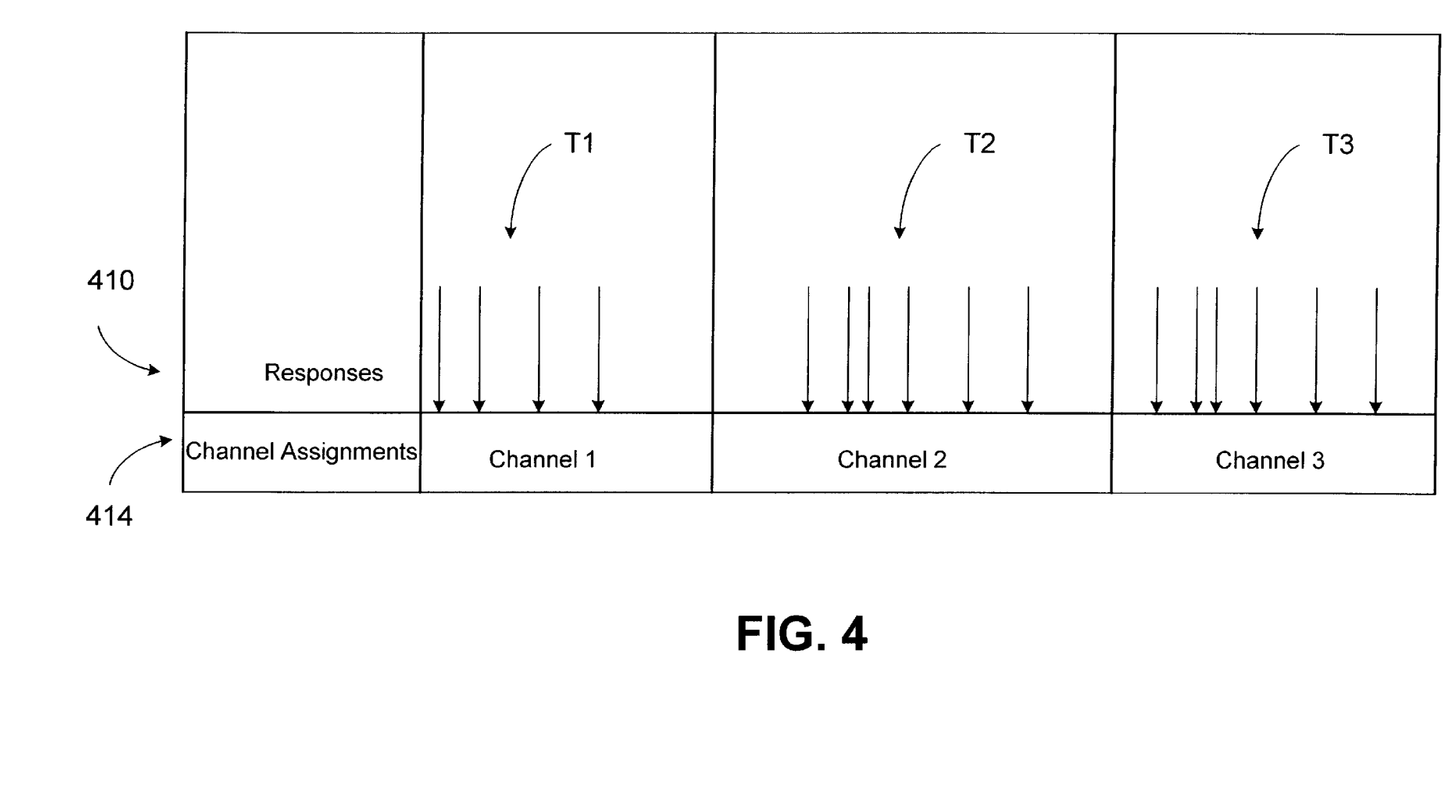

FIGS. 3 and 4 are timing diagrams that illustrate a random distribution of the transmission of response signals by a plurality of subscriber units responsive to a multicast message page from a network control center and how subsequent channel allocations are made responsive to the random distribution of responses according to a preferred embodiment of the invention. Referring now to FIG. 3, as shown generally at 304, a NCC 102 transmits a multicast page to satellite 104 that, in turn, relays the page to a group of subscriber units including subscriber units 204A–204D. As shown generally at 308, only subscriber unit 204A responded with an acknowledge signal within a first time period T1. After that, within time period T2, as shown at 312, subscriber units 204B and 204C responded with acknowledge signals transmitted to satellite 104 and then to NCC 102. Finally, as shown at 316, subscriber unit 204D responded within time frame T3.

FIG. 4 more specifically illustrates channel assignments made by NCC 102 according to the random responses by the subscriber units 204 for many subscriber units 204. More specifically, each of the subscriber units that respond within a time period T1, T2 or T3, as illustrated in the row shown generally at 410 are assigned specified channels for receiving a multicast message as shown generally at 314. More specifically, by way of example, those subscriber units that responded within time period T1 are assigned to Channel 1, those that responded within time period T2 are assigned to Channel 2 and those that responded within time period T3 are assigned to Channel 3. The system disclosed herein is advantageous in that, by randomly distributing acknowledge signals over time, specific acknowledgments to multicast messages may be had even with limited control and message communication channel resources that exist in satellite-based communication networks.

Figure 5:
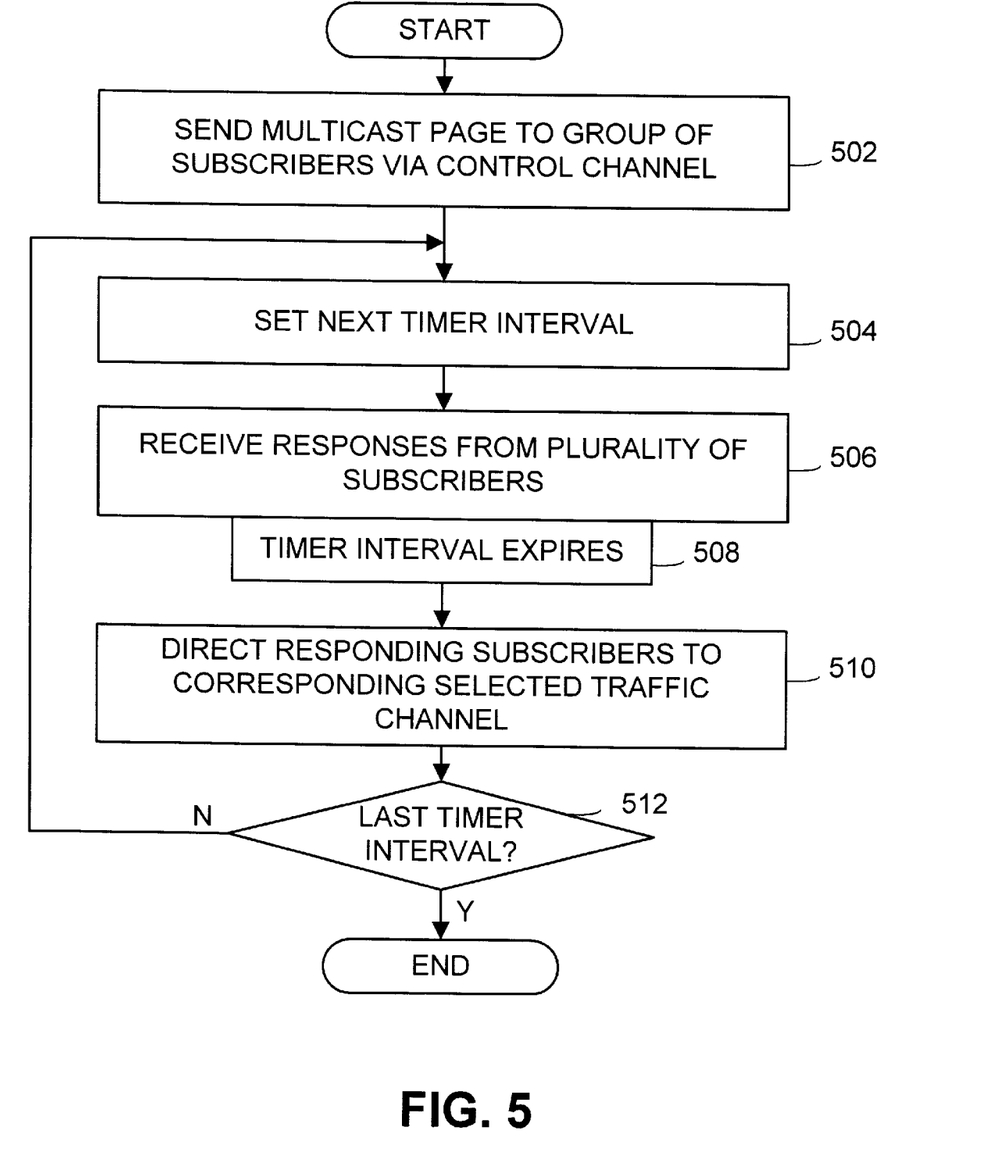
FIG. 5 is a flow chart illustrating a method within a network control center of allocating multicast channels responsive to randomly received acknowledge response times according to a preferred embodiment of the inventive method.

FIG. 5 is a flow chart illustrating a method within a network control center of allocating multicast channels responsive to randomly received acknowledge response times according to a preferred embodiment of the inventive method. More specifically, a NCC 102 initially transmits a multicast page intended for a select group of subscriber units 204 by way of a control channel (step 502). The multicast page includes a group ID that reflects the select group of subscriber units that are to receive a corresponding multicast message. Thereafter, NCC 102 sets a timer interval that corresponds to the time periods (T1–T3) of FIGS. 3 and 4 (step 504).

NCC 102 monitors and creates a list of subscriber units that respond within the time periods T1–T3 (step 506) until NCC 102 determines that all of the time periods T1–T3 have expired (step 508). It is understood that the specific time period is iteration dependent. In other words, the relevant time period is T1 in a first iteration, T2 in a second iteration, T3 in a third iteration, etc. for the method shown in FIG. 5.

Additionally, after each time period T1–T3 has expired, NCC 102 transmits a responding signal to the list of subscribers that responded within the last time period T1–T3 to specify a select traffic channel for the multicast message. The iterative process is continued until a defined number of time periods for receiving subscriber unit acknowledge responses have expired (step 512). In the described embodiment, all three time periods T1–T3 have expired. Additionally, while the described embodiment illustrates that three time periods are defined for receiving responses and for allocating corresponding multicast channels, the number of time periods and multicast channels may be varied to include either more or less time periods and multicast channels.

Figure 6:
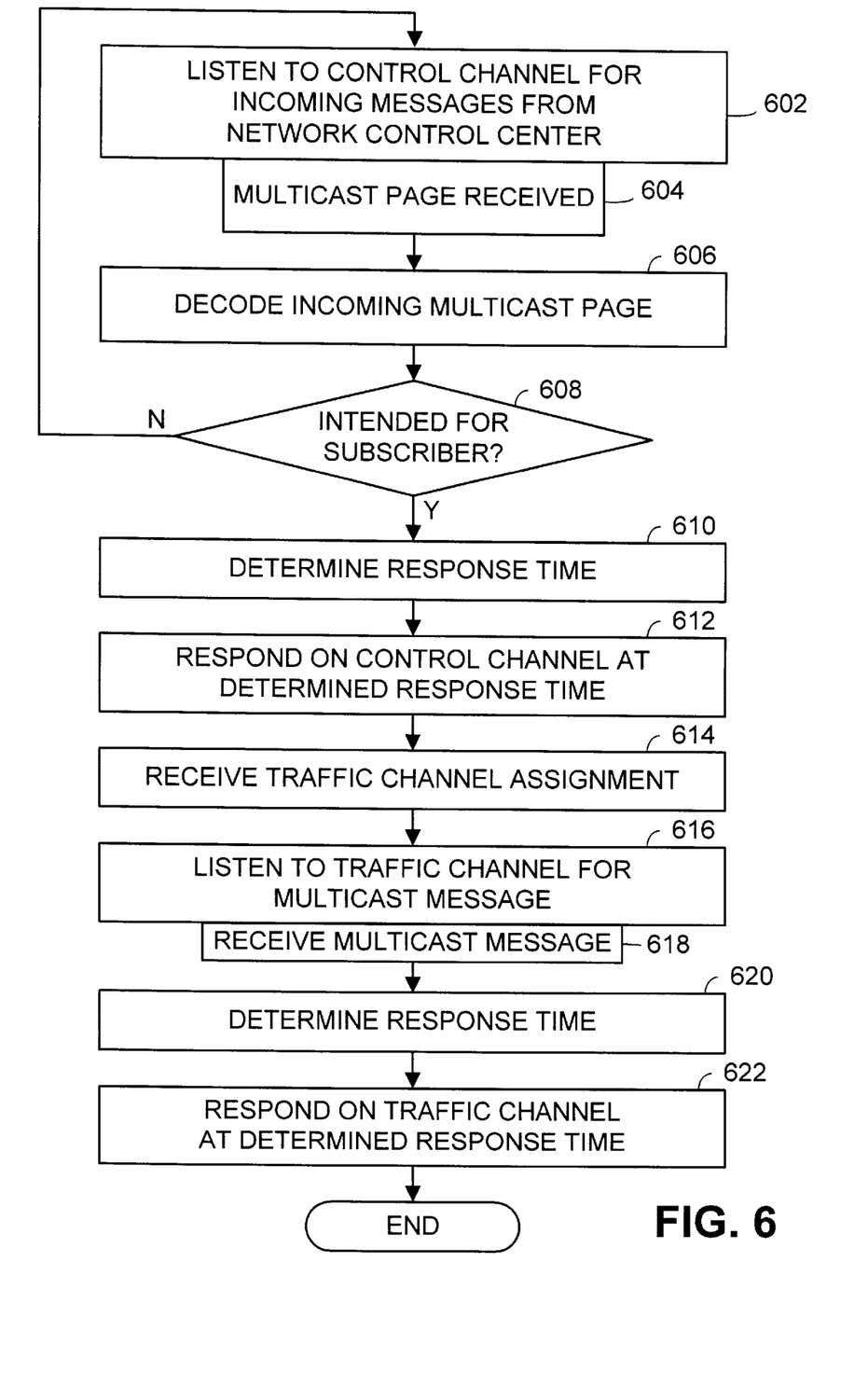
FIG. 6 is a flowchart illustrating a method within a subscriber unit for receiving a multicast message originated by a network control center and relayed by a satellite according to a preferred embodiment of the inventive method.

FIG. 6 is a flowchart illustrating a method within a subscriber unit for receiving a multicast message originated by a network control center and relayed by a satellite according to a preferred embodiment of the inventive method. As known by those skilled in the art, a mobile terminal or subscriber unit continuously listens on a control channel for pages and control commands from a control center. In a terrestrial cellular network, the control channel signals are transmitted from a base station transceiver. In a satellite based cellular communication network, the control channel communication signals are transmitted by a network control center to a satellite that, in turn, relays the control channel communication signals to the subscriber units.

Accordingly, the subscriber units are continuously in a listening mode to detect control channel communication signals. The first step of the inventive method, therefore, is to listen on the control channel for incoming messages (step 602). The subscriber unit continues to listen until it determines that it has received a multicast page from a satellite originated by a network control center (step 604).

After determining that it has received a multicast page, (step 606) in the described embodiment, the subscriber unit evaluates a first signal portion to determine the recipient ID for the communication signal (step 606). The subscriber unit then either compares the ID to at least one stored ID to determine whether the signal is intended for it. More specifically, the subscriber unit compares the ID in the first signal portion to its own terminal ID if the signal is of a type intended for just one subscriber unit. The subscriber unit compares the ID to at least one group ID to determine if the message is of a type that is intended for a group. The subscriber unit determines, from these comparisons, whether the incoming message is a multicast page and intended for it (step 608).

It is understood, of course, that there are different approaches that may be implemented to achieve the same result. For example, in one alternate embodiment, the communication signal does not include a signal portion that identifies whether the signal is intended for just one subscriber unit or whether it is a multicast signal intended for a group of subscriber units. For this alternate embodiment, the subscriber unit merely compares the received ID with its own terminal ID and also to its group IDS until it determines whether the communication signal is intended for it. Ultimately, in each of the embodiments, the subscriber unit determines whether the incoming message is intended for it.

If the message is not intended for it, the subscriber unit merely resumes listening to the control channel as described in step 602. Otherwise, if the message is for the subscriber unit, it determines a response time for transmitting an acknowledge signal (step 610). Thereafter, once the response time is reached, or a specified waiting period has elapsed, the subscriber unit responds on the control channel (step 612).

After the subscriber unit transmits the acknowledge signal, it must then wait for an indication of the traffic channel upon which the subscriber unit is to receive the actual multicast message (step 614). In the described embodiment, the channel assignment for the multicast message is received on a control channel. After receiving a multicast channel assignment, the subscriber unit listens on the specified channel for the multicast message (step 616) until the message is received (step 618). Thereafter, the subscriber unit determines a random response delay time for transmitting an acknowledge signal to acknowledge that it received the multicast message(step 620). Once the random response delay time has passed, the subscriber unit generates an acknowledge signal to acknowledge that it received the multicast message (step 622).

In the described embodiment, the multicast acknowledge message is transmitted on the traffic channel. In this embodiment, therefore, both a forward link traffic channel and a reverse link traffic channel must be assigned. However, in an alternate embodiment, the acknowledge is transmitted on the control channel.

Figure 7:
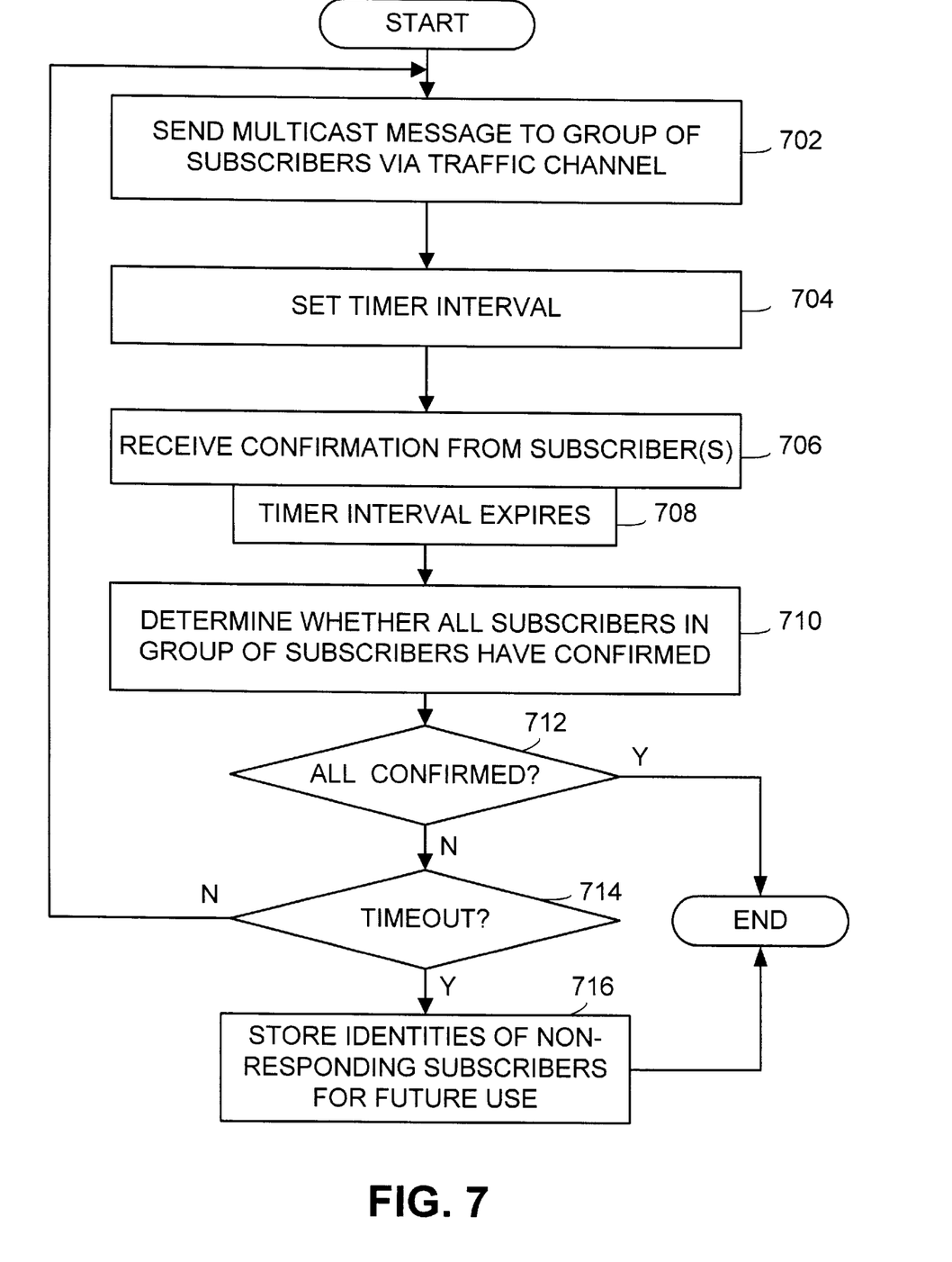
FIG. 7 is a logic flow diagram illustrating a method for transmitting a multicast message to a select group of subscriber units according to a preferred embodiment of the invention.

FIG. 7 is a logic flow diagram illustrating a method for transmitting a multicast message to a select group of subscriber units according to a preferred embodiment of the invention. First, a multicast message is transmitted from a NCC 102 via a satellite 104 to a group of subscribers (step 702). Once NCC 102 transmits the multicast message to satellite 104, it sets a timer interval that is equal to one of the time periods T1–T3 of FIG. 3 (step 704). The timer interval is one in which is adequately long for each of the recipient subscriber units receiving a multicast message being transmitted on a previously specified traffic channel to respond. By way of example, if the internal logic of the subscriber units is likely to cause a given subscriber unit 204 to respond with an acknowledge signal within a time range of 1000 milliseconds, then the time interval here is at least as long as the maximum subscriber unit response time plus propagation delays that result from the subscriber unit's response (uplink to the satellite 104 and subsequent downlink from satellite 104 to NCC 102). By way of example, the timer interval herein is a value that is at least 1.25 seconds for a geostationary satellite.

Once the timer interval is set to a specified value, NCC 102 listens for acknowledge responses from the subscriber units 204 and forms a list to determine which of the subscriber units 204 that belong to the specified group that is to receive the multicast message have responded with an acknowledge signal. Once NCC 102 determines that the timer interval has expired (step 708), it determines whether all of the subscriber units in the specified group have responded with an acknowledge (step 710). If all of the subscriber units in the select group have responded with an acknowledge, NCC 102 ends the method (step 712). If not all of the subscriber units in the select group have responded, NCC 102 determines if a specified amount of time for the complete multicast messaging process has elapsed (step 714). If the specified amount of time for all of the group to respond has not expired, the process is continued with step 702 wherein the multicast message is retransmitted and the subsequent steps are repeated. If, however, a specified amount of time has elapsed, NCC 102 forms a list that identifies the subscriber units that did not respond with an acknowledge by comparing the list of subscriber units within the select group to the list of terminals for which an acknowledge response was received.

Figure 8:
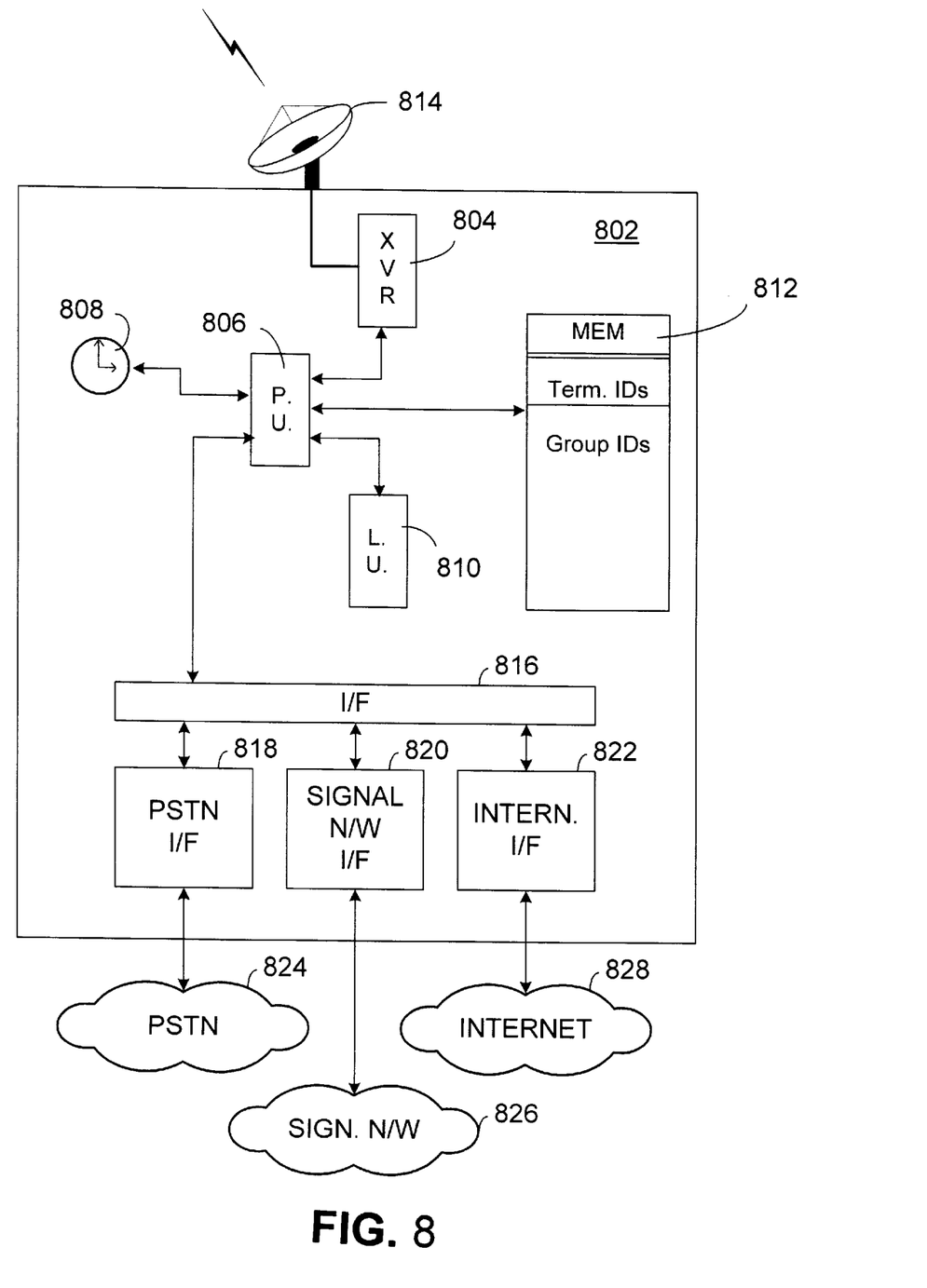
FIG. 8 is a functional block diagram illustrating a network control center that supports communications with a plurality of subscriber units via a satellite according to a preferred embodiment of the invention.

FIG. 8 is a functional block diagram illustrating a network control center 802 that supports communications with a plurality of subscriber units via a satellite according to a preferred embodiment of the invention. The NCC 802 includes a radio frequency transceiver 804 coupled to an antenna 814 that, in combination, send and receive satellite based communications. The transceiver 804 also couples to a processing unit 806. The processing unit 806 couples to a clock 808, a logic unit 810, memory 812 and an interface 816. The memory stores 812 program instructions, terminal identifiers and group identifiers among other stored elements.

The NCC 802 services both voice and data communications. Thus, the NCC 802 couples to the Public Switched Telephone Network (PSTN) 824 via a PSTN I/F 818 and to the Internet 828 (or other packet switched networks) via an Internet I/F 822. Further, for compatibility in communication message switching, the NCC 802 also couples to a signaling network 826 via a signaling network I/F 820. These elements in combination therefore interfaces the NCC 802 to other communication networks so that it may support messaging and other operations according to the present invention.

The invention disclosed herein is susceptible to various modifications and alternative forms. Specific embodiments therefor have been shown by way of example in the drawings and detailed description. It should be understood, however, that the drawings and detailed description thereto are not intended to limit the invention to the particular form disclosed, but on the contrary, the invention is to cover all modifications, equivalents and alternatives falling within the spirit and scope of the present invention as defined by the claims.

What is claimed is:

1. A subscriber unit for wirelessly communicating with a satellite communication system network, the subscriber unit comprising:

an antenna;

a radio frequency transceiver coupled to the antenna;

a memory that stores the subscriber unit's terminal ID and a group ID;

a processing unit that couples to the memory and to the radio frequency transceiver, the processing unit communicating with the satellite communication system network via the radio frequency transceiver and antenna, the processing unit initiating the transmission of an acknowledge signal in response to a multicast communication page after a random delay;

the processing unit listening for a multicast transmission on a first traffic channel when initiating the transmission of the acknowledge signal within a first time period; and the processing unit listening for a multicast transmission on a second traffic channel when initiating the transmission of the acknowledge signal within a second time period.

2. The subscriber unit of claim 1, wherein the processing unit initiates the transmission of an acknowledge signal immediately after receiving a communication page that includes the subscriber unit's terminal ID.

3. The subscriber unit of claim 1, wherein the processing unit initiates the transmission of a acknowledge signal after a random period of time in response to a multicast communication page that included a group ID that is the same as the group ID stored in the memory.

4. The subscriber unit of claim 1, further comprising:

a random number generator that produces random numbers; and a clock for generating clock signals, the clock signals used by the processing unit in conjunction with the random numbers to determine when the random period of time has expired.

5. The subscriber unit of claim 1, wherein:

the processing unit receives a muiticast communication message on a traffic channel in response to a command from the satellite communication system network via the radio frequency transceiver and antenna; and the processing unit initiates the transmission of an acknowledge signal to the multicast communication message after a random delay.

6. The subscriber unit of claim 5, wherein the processing unit initiates the transmission of the acknowledge signal to the multicast communication message on the traffic channel.

7. The subscriber unit of claim 6, wherein the processing unit initiates the transmission of the acknowledge signal to the multicast communication message on a control channel.

8. A subscriber unit for wirelessly communicating with a satellite communication system network, the subscriber unit comprising:

an antenna;

a radio frequency transceiver coupled to the antenna;

a processing unit that couples to the memory and to the radio frequency transceiver, the processing unit communicating with the satellite communication system network via the radio frequency transceiver and antenna, the processing unit initiating the transmission of an acknowledge signal to a multicast communication message after a random delay;

the processing unit listening for a multicast transmission on a first traffic channel when initiating the transmission of the acknowledge signal within a first time period; and the processing unit listening for a multicast transmission on a second traffic channel when initiating the transmission of the acknowledge signal within a second time period.

9. The subscriber unit of claim 8, further comprising:

a memory that stores the subscriber unit's terminal ID and a group ID; and wherein the processing unit only acknowledges a multicast communication message containing a group ID that is equal to the group ID stored in the memory.

10. The subscriber unit of claim 8 further comprising:

a random number generator that produces random numbers; and a clock for generating clock signals, the clock signals used by the processing unit in conjunction with the random numbers to determine when the random period of time has expired.

11. The subscriber unit of claim 8, wherein the processing unit initiates the transmission of the acknowledge signal to the multicast communication message on the traffic channel.

12. The subscriber unit of claim 8, wherein the processing unit initiates the transmission of the acknowledge signal to the multicast communication message on a control channel.

13. A network control center for wirelessly communicating with a plurality of subscriber units via a satellite, the satellite network control center comprising:

an antenna;

a radio frequency transceiver coupled to the antenna;

a processing unit that couples to the memory and to the radio frequency transceiver, the processing unit sending a multicast communication page to the plurality of subscriber units;

the processing unit receiving responses to the multicast communication page from the plurality of subscriber units that are distributed over time; and the processing unit assigning a first plurality of responding subscriber units that acknowledge the multicast communication page during a first time period to a first traffic channel; and the processing unit assigning a second plurality of responding subscriber units that acknowledge the multicast communication page during a second time period to a second traffic channel.

14. The network control center of claim 13, wherein:

the processing unit initiates transmission of a multicast communication message to the first plurality of subscriber units on the first traffic channel; and the processing unit initiates transmission of the multicast communication message to the second plurality of subscriber units on the second traffic channel.

15. The network control center of claim 14, wherein the processing unit receives multicast communication message acknowledge signals from the subscriber units, wherein the multicast communication message acknowledge signals are distributed over time.

16. The network control center of claim 15, wherein the processing unit further determines which of the subscriber units have acknowledged receipt of the multicast communication message.

17. The network control center of claim 14, wherein:

the processing unit receives acknowledge signals to the multicast communication message from the first plurality of subscriber units, the acknowledge signals being distributed over a time; and the processing unit receives acknowledge signals to the multicast communication message from the second plurality of subscriber units, the acknowledge signals being distributed over a time.

18. The network control center of claim 17, wherein:

the processing unit further determines which of the subscriber units have acknowledged receipt of the multicast communication message; and the processing unit initiates retransmission of the multicast communication message to those subscriber units that did not acknowledge receipt of the multicast communication message.

19. A method for transmitting a multicast communication message to a plurality of subscriber units in a satellite based communication system, the method comprising:

transmitting a multicast communication page to the plurality of subscriber units;

receiving acknowledgments to the multicast communication page from the plurality of subscriber units over time;

assigning a first plurality of responding subscriber units that acknowledge the multicast communication page during a first time period to a first traffic channel;

assigning a second plurality of responding subscriber units that acknowledge the multicast communication page during a second time period to a second traffic channel;

transmitting the multicast communication message to the first plurality of subscriber units on the first traffic channel; and transmitting the multicast communication message to the second plurality of subscriber units on the second traffic channel.

20. The method of claim 19, further comprising:

receiving acknowledgments to the multicast communication message from the first plurality of subscriber units, the responses being distributed over a time; and receiving acknowledgments to the multicast communication message from the second plurality of subscriber units, the responses being distributed over a time.

21. The method of claim 20 further comprising:

determining which of the subscriber units have acknowledged receipt of the multicast communication message; and retransmitting the multicast communication message to those subscriber units that did not acknowledge receipt of the multicast communication message.

22. A method of receiving multicast communications by a subscriber unit in a satellite communication system, the method comprising:

receiving a multicast communication page;

determining a random delay period;

after expiration of the random delay period, acknowledging receipt of the multicast communication page;

receiving a traffic channel assignment;

receiving the multicast communication message on a first traffic channel when the random delay period corresponds to a first time period; and receiving the multicast communication message on a second traffic channel when the random delay period corresponds to a second time period.

23. The method of claim 22, wherein the subscriber unit receives a traffic channel assignment from the satellite communication system.

24. The method of claim 22, further comprising:

if the multicast communication page is intended for the subscriber unit, immediately acknowledging receipt of the multicast communication page; and if the multicast communication page is intended for a group of which the subscriber unit is a member, after expiration of the random delay period, acknowledging receipt of the multicast communication.

* * * * *